US012511980B2

(12) United States Patent
Long

(10) Patent No.: US 12,511,980 B2
(45) Date of Patent: Dec. 30, 2025

(54) METHOD FOR CONTROLLING A TELLER MACHINE

(71) Applicant: DIGITAL FIRST HOLDINGS LLC, Atlanta, GA (US)

(72) Inventor: Justin Long, Kennesaw, GA (US)

(73) Assignee: DIGITAL FIRST HOLDINGS LLC, Atlanta, GA (US)

( * ) Notice: Subject to any disclaimer, the term of this patent is extended or adjusted under 35 U.S.C. 154(b) by 0 days.

(21) Appl. No.: 18/385,661

(22) Filed: Oct. 31, 2023

(65) Prior Publication Data

US 2025/0140079 A1    May 1, 2025

(51) Int. Cl.
*G07F 19/00* (2006.01)
*H04L 9/40* (2022.01)

(52) U.S. Cl.
CPC .......... *G07F 19/203* (2013.01); *G07F 19/206* (2013.01); *H04L 63/0807* (2013.01)

(58) Field of Classification Search
CPC ... G07F 19/203; G07F 19/206; H04L 63/0807
USPC ....................................................... 235/379
See application file for complete search history.

(56) References Cited

U.S. PATENT DOCUMENTS

| 8,657,188 B2* | 2/2014 | Ma ........................ G06F 1/3293 902/8 |
| 2024/0104533 A1* | 3/2024 | Thimmareddy ...... G07F 19/203 |

* cited by examiner

*Primary Examiner* — Daniel A Hess
(74) *Attorney, Agent, or Firm* — Notaro, Michalos & Zaccaria P.C.; John S. Economou

(57) ABSTRACT

A user interface component receives a service request from a user and transmits a service request message to a business application component. The business application component transmits an authorisation request message to a media authorisation component. The media authorisation component generates a token based on the authorisation request message and transmits a search message to a controller. The controller transmits the search message to a plurality of backend components. The controller transmits a response message from the backend components to the media authorisation component. The media authorisation component determines whether the token is valid based on the response message. The media authorisation component transmits a validation message to the business application component. Based on the service request message and the validation message, the business application component transmits a control message to a media device driver to control the media device driver to dispense physical media from a teller machine.

18 Claims, 3 Drawing Sheets

METHOD FOR CONTROLLING A TELLER MACHINE

FIELD OF THE INVENTION

This invention relates to a computer-implemented method for controlling a teller machine.

BACKGROUND

It is known for a customer to perform various financial actions when located at an automated teller machine (ATM), such as withdrawing cash. However known approaches suffer from the problem of fraudulent actions being performed by a third party, such as unauthorised access to a customer bank account or to cash stored in the ATM.

This invention is aimed at providing an improved method which overcomes at least some of these difficulties.

SUMMARY

According to the invention there is provided a computer-implemented method for controlling a teller machine, the method comprising the steps of:
   a user interface component receiving a service request from a user,
   transmitting a service request message from the user interface component to a business application component, the business application component receiving a validation message, and
   the business application component transmitting a control message to a media device driver to control the media device driver to dispense physical media based on the service request message and the validation message.

The business application component, rather than the user interface component, is used to control the media device driver. The invention thus ensures that the physical media will only be dispensed from the teller machine when authorised. In this manner the invention prevents unauthorised access to a customer bank account, or to any physical media or cash stored in the teller machine.

The business application component has authority to control the media device driver to dispense the physical media. The user interface component does not have authority to control the media device driver to dispense the physical media. The invention thus results in a security boundary within the teller machine separating the user interface component from the business application component.

The user interface component may have a first set of capability parameters to control a teller machine to execute a first set of teller machine tasks, the first set of teller machine tasks excluding controlling the media device driver to dispense physical media. In this manner the user interface component does not have the ability to control the media device driver to dispense physical media. The invention thus achieves enhanced security to prevent unauthorised access to a customer bank account, or to any physical media or cash stored in the teller machine. The user interface component may comprise a web based browser. By limiting the available tasks of the user interface component, the invention prevents any possible hacking or interference of the web based browser being used to access a customer bank account, or any physical media or cash stored in the teller machine. The business application component may have a second set of capability parameters to control a teller machine to execute a second set of teller machine tasks, the second set of teller machine tasks including controlling the media device driver to dispense physical media. Only the business application component, and not the user interface component, may be used to control the media device driver to dispense physical media from the teller machine. The user interface component may have a first level of security to control a teller machine to execute a first set of teller machine tasks, the first level of security excluding controlling the media device driver to dispense physical media. In this manner the user interface component does not have the ability to control the media device driver to dispense physical media. The invention thus achieves enhanced security to prevent unauthorised access to a customer bank account, or to any physical media or cash stored in the teller machine. The business application component may have a second level of security to control a teller machine to execute a second set of teller machine tasks, the second level of security including controlling the media device driver to dispense physical media. Only the business application component, and not the user interface component, may be used to control the media device driver to dispense physical media from the teller machine.

The teller machine may comprise the user interface component, the business application component, and the media device driver.

The method may comprise the steps of:
   the business application component transmitting an authorisation request message to a media authorisation component, and
   the media authorisation component transmitting the validation message to the business application component.

The invention thus ensures that the physical media will only be dispensed from the teller machine when authorised.

The media authorisation component may be located remotely from the business application component. The method may comprise the step of the media authorisation component generating a token based on the authorisation request message. The method may comprise the step of the media authorisation component transmitting a search message to one or more backend components. By checking with the backend components, the invention determines whether the requested service should be provided to the user. For example the balance of a customer bank account may be checked before dispensing cash. The backend component may comprise at least one of a database, a software application, or a computer program. Examples of backend components may be a customer account database, a customer transaction daily limit database, a customer log-in details database, a customer identification information database, a component to maintain a synchronized time, a transaction trend database, a customer location database, a customer preferences database, a multi-factor authorizations database. Multi-factor authorization may include transmitting a prompt for biometric data that may be compared during validation.

The method may comprise the steps of:
   the media authorisation component receiving a response message from the one or more backend components, and
   the media authorisation component determining whether the token is valid based on the response message.

By checking with the backend components, the invention determines whether the requested service should be provided to the user.

The user may be located in proximity to the user interface component. The user may comprise a customer. For example the customer may operate the teller machine in a self-service mode without requiring any assistance.

The user may be located remotely from the user interface component. The method may comprise the steps of:
- a remote user channel component receiving the service request from the user, and
- the remote user channel component transmitting the service request message to the user interface component.

The user may comprise at least one of a bank teller, an automated machine, a machine learning tool, a computer program, a financial sales agent, a customer support agent, a retail sales agent, or a hospitality sales agent. For example the bank teller at the remote location may assist the customer at the teller machine. The user may comprise the customer. For example the customer may remotely control the ATM or the teller machine using a mobile telephone or mobile device.

In another aspect of the invention there is provided a data processing system for controlling a teller machine, the system comprising a processor configured to:
- receive a service request at a user interface component from a user,
- transmit a service request message from the user interface component to a business application component,
- receive a validation message at the business application component, and
- transmit a control message from the business application component to a media device driver to control the media device driver to dispense physical media based on the service request message and the validation message.

The business application component, rather than the user interface component, is used to control the media device driver. The invention thus ensures that the physical media will only be dispensed from the teller machine when authorised. In this manner the invention prevents unauthorised access to a customer bank account, or to any physical media or cash stored in the teller machine.

The business application component has authority to control the media device driver to dispense the physical media. The user interface component does not have authority to control the media device driver to dispense the physical media. The invention thus results in a security boundary within the teller machine separating the user interface component from the business application component.

The invention also provides in another aspect a computer program product stored on a non-transitory computer readable storage medium, the computer program product comprising instructions capable of causing a computer system to perform a method of the invention when the computer program product is executed on the computer system.

BRIEF DESCRIPTION OF THE DRAWINGS

Embodiments of the invention will be described hereinafter, by way of example only, with reference to the accompanying drawings, in which.

DETAILED DESCRIPTION

Figure 1:
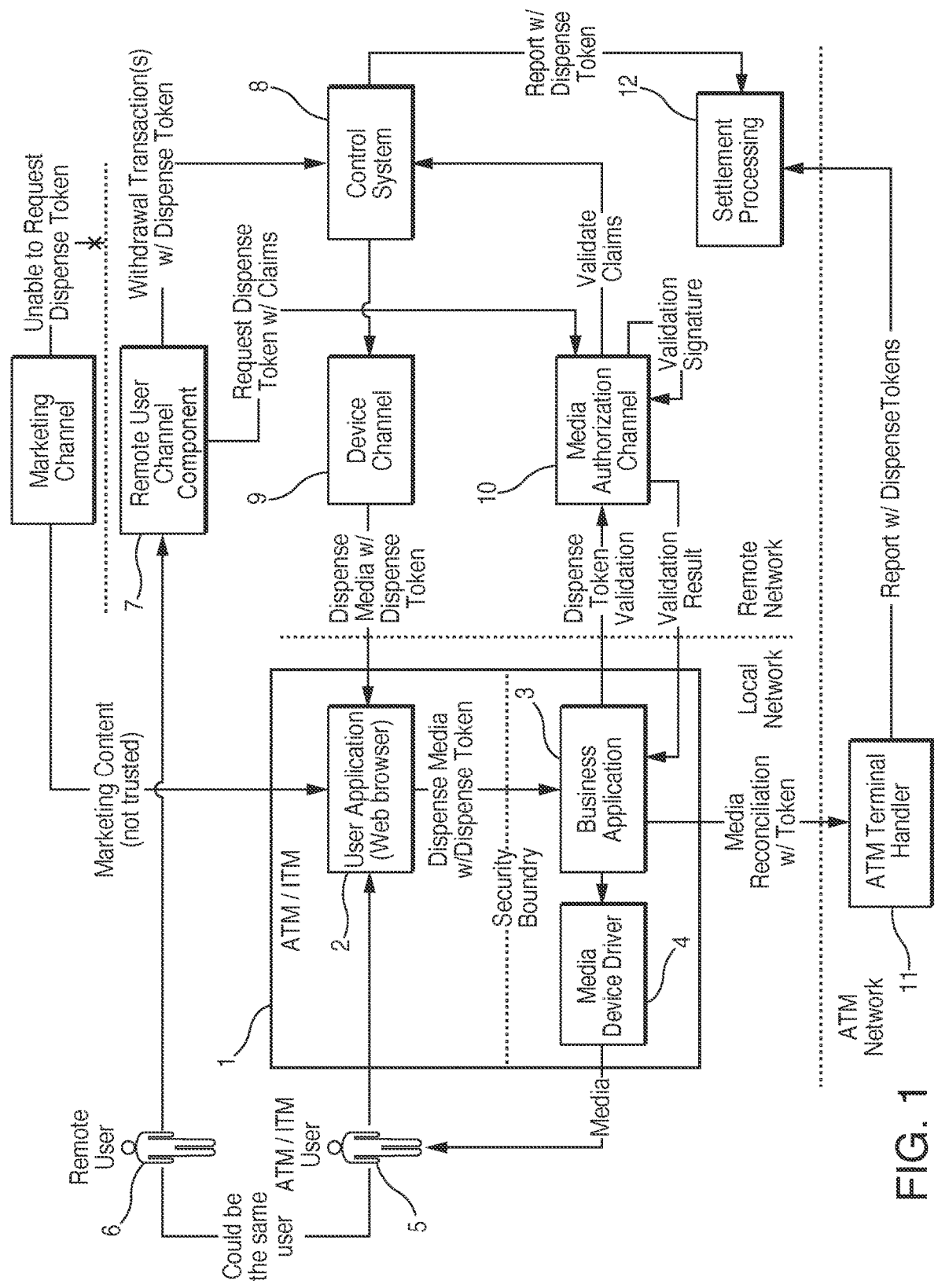
FIG. 1 is a schematic illustration of a data processing system according to the invention.
Figure 2:
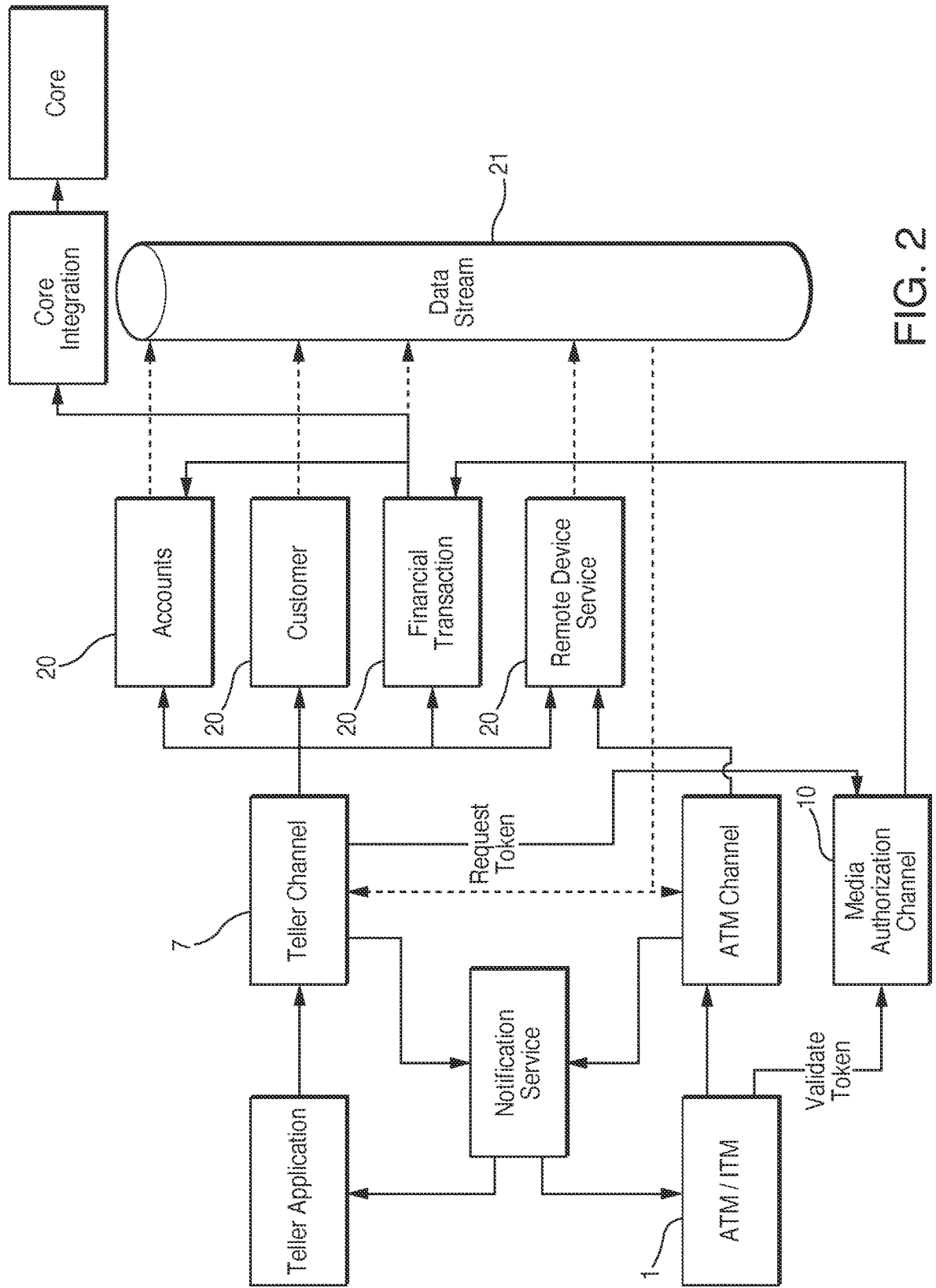
FIG. 2 is a schematic illustration of part of the data processing system of FIG. 1.
Figure 3:
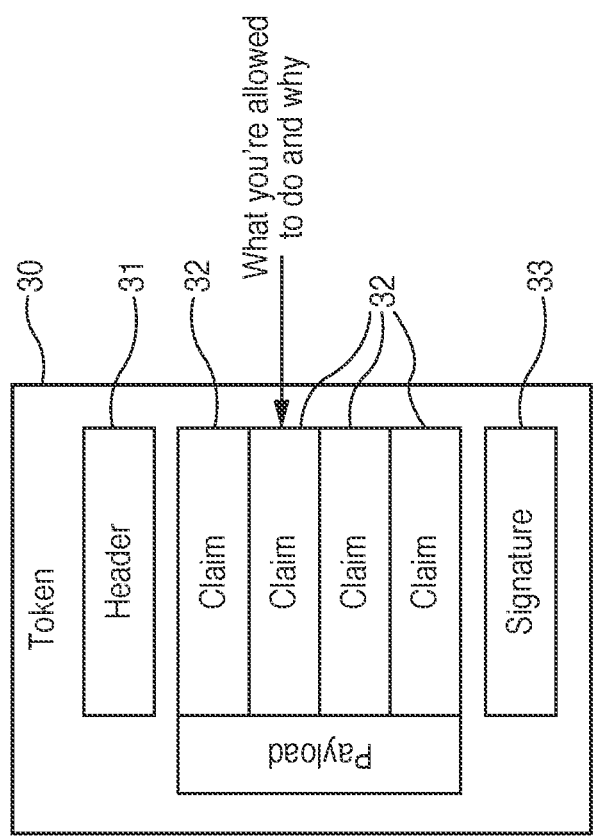
FIG. 3 is a schematic illustration of a token of the data processing system of FIG. 1.

Referring to FIGS. 1 to 3 there is illustrated a data processing system according to the invention. The data processing system may be employed to control a teller machine 1.

The teller machine 1 includes a user interface component 2, a business application component 3, and a media device driver 4.

The user interface component 2 may be a web based browser. The user interface component 2 has a first set of capability parameters to control the teller machine 1 to execute a first set of teller machine tasks. This first set of teller machine tasks does not include controlling the media device driver 4 to dispense physical media, such as cash or cheques, from the teller machine 1. In contrast the business application component 3 has a second set of capability parameters to control the teller machine 1 to execute a second set of teller machine tasks. This second set of teller machine tasks includes controlling the media device driver 4 to dispense physical media from the teller machine 1.

Similarly the user interface component 2 has a first level of security to control the teller machine 1 to execute the first set of teller machine tasks. This first level of security does not include controlling the media device driver 4 to dispense physical media from the teller machine 1. In contrast the business application component 3 has a second level of security to control the teller machine 1 to execute the second set of teller machine tasks. This second level of security includes controlling the media device driver 4 to dispense physical media from the teller machine 1.

In use the user interface component 2 receives a service request from a user 5, 6.

For example the user 5 may be a customer located in proximity to the user interface component 2 of the teller machine 1. In this case the user interface component 2 receives the service request directly from the local user 5 in a customer initiated request procedure.

As another example the user 6 may be located remotely from the user interface component 2 of the teller machine 1. In this example the remote user 6 may be a bank teller, or an automated machine, or a machine learning tool, or a computer program, or a financial sales agent, or a customer support agent, or a retail sales agent, or a hospitality sales agent. For example the bank teller 6 may request a service on behalf of the customer.

In this case the data processing system includes a remote user channel component 7. The remote user channel component 7 receives the service request from the remote user 6. The remote user channel component 7 transmits a service request message to a controller 8. The controller 8 transmits the service request message to a device channel component 9. The device channel component 9 transmits the service request message to the user interface component 2.

For either case of the local user 5 or the remote user 6, the user interface component 2 transmits the service request message to the business application component 3.

The business application component 3 transmits an authorisation request message to a media authorisation component 10. The media authorisation component 10 is located remotely from the business application component 3 of the teller machine 1.

The media authorisation component 10 generates a token 30 (FIG. 3) based on the authorisation request message. In this case the token 30 incudes a header part 31, a plurality of claim parts 32, and a signature part 33.

The media authorisation component 10 transmits a search message to the controller 8. The controller 8 transmits the search message to a plurality of backend components 20 (FIG. 2). Each backend component 20 may be a database, or a software application, or a computer program. Each backend component 20 transmits event messages to a central data stream 21. The controller 8 retrieves event data from the central data stream 21.

The controller 8 transmits a response message from the backend components 20 to the media authorisation component 10. The media authorisation component 10 determines whether the token 30 is valid based on the response message. The media authorisation component 10 transmits a validation message to the business application component 3.

Based on the service request message and the validation message, the business application component 3 transmits a control message to the media device driver 4 to control the media device driver 4 to dispense physical media from the teller machine 1.

The data processing system may also be employed for data reconciliation of financial transactions performed at the teller machine 1.

In use, the business application component 3 of the teller machine 1 transmits a reconciliation message to a terminal handler component 11. The terminal handler component 11 is located remotely from the teller machine 1. The reconciliation message includes a first set of transaction data relating to a financial transaction performed at the teller machine 1. The first set of transaction data transmitted to the terminal handler component 11 does not include some elements of transaction information relating to the financial transaction performed at the teller machine 1. In particular the first set of transaction data transmitted to the terminal handler component 11 is incomplete and is missing certain elements of transaction information relating to the financial transaction performed at the teller machine 1. The reconciliation message also includes the validated token 30.

The first set of transaction data transmitted to the terminal handler component 11 is incomplete. For example the first set of transaction data transmitted to the terminal handler component 11 of the ATM may not include information why the media device driver 4 dispensed the physical media from the teller machine 1. The system of the invention enables the terminal handler component 11 to correlate the action performed by the teller machine 1 with the controller 8 and the backend components 20 that controlled the actions of the teller machine 1. For example a teller may take $50 from 4 different accounts. This is performed as 4 separate transactions. However the teller machine 1 may only have been instructed to dispense a single overall amount of $200.

The terminal handler component 11 transmits the reconciliation message to a settlement processing component 12. The settlement processing component 12 is located remotely from the terminal handler component 11.

The controller 8 retrieves a second set of transaction data relating to the financial transaction performed at the teller machine 1 from the backend components 20. The second set of transaction data stored in the backend components 20 includes all elements of transaction information relating to the financial transaction performed at the teller machine 1. In particular the second set of transaction data stored in the backend components 20 is complete and includes all relevant information relating to the financial transaction performed at the teller machine 1.

The controller 8 transmits the second set of transaction data to the settlement processing component 12. The settlement processing component 12 determines correlation data based on the first set of transaction data and the second set of transaction data.

The settlement processing component 12 transmits the correlation data to the controller 8. The controller 8 transmits the correlation data to the backend components 20. The correlation data may be used for subsequent tasks, such as for auditing where did an amount of money go to and why was the amount of money transmitted.

Throughout the description and claims of this patent specification, the words "comprise" and "contain" and variations of them mean "including but not limited to" and they are not intended to and do not exclude other moieties, additives, components, integers or steps. Throughout the description and claims of this patent specification, the singular encompasses the plural unless the context otherwise requires. In particular, where the indefinite article is used, the patent specification is to be understood as contemplating plurality as well as singularity, unless the context requires otherwise.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

Features, integers, characteristics or groups described in conjunction with a particular aspect, embodiment or example of the invention are to be understood to be applicable to any other aspect, embodiment or example described herein unless incompatible therewith. All of the features disclosed in this patent specification including any accompanying claims, abstract and drawings, and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this patent specification including any accompanying claims, abstract and drawings, or to any novel one, or any novel combination, of the steps of any method or process so disclosed.

I claim:

1. A computer-implemented method for controlling a teller machine, the method comprising the steps of:
   receiving a service request from a user via a user interface component integrated within the teller machine, the user interface component having a first set of capability parameters to control the teller machine to execute a first set of teller machine tasks, the first set of teller machine tasks excluding any ability to issue control commands to a media device driver integrated within the teller machine to dispense physical media,
   transmitting the service request message from the user interface component to a separate business application component integrated within the teller machine,
   transmitting an authorisation request message from the business application component to a media authorisation component located remotely from the teller machine,
   receiving a validation message at the business application component from the media authorisation component, and transmitting a control message from the business application component to the media device driver to control the media device driver to dispense physical media based on the service request message and the validation message.

2. The method as claimed in claim 1 wherein the user interface component comprises a web-based browser.

3. The method as claimed in claim 1 wherein the business application component has a second set of capability parameters to control a teller machine to execute a second set of teller machine tasks, the second set of teller machine tasks including controlling the media device driver to dispense physical media.

4. The method as claimed in claim 1 wherein the user interface component has a first level of security to control a teller machine to execute a first set of teller machine tasks, the first level of security excluding controlling the media device driver to dispense physical media.

5. The method as claimed in claim 1 wherein the business application component has a second level of security to control a teller machine to execute a second set of teller machine tasks, the second level of security including controlling the media device driver to dispense physical media.

6. The method as claimed in claim 1 wherein the teller machine comprises the user interface component, the business application component, and the media device driver.

7. The method as claimed in claim 1 wherein the method comprises:
the media authorisation component transmitting the validation message to the business application component.

8. The method as claimed in claim 7 wherein the method comprises the step of the media authorisation component generating a token based on the authorisation request message.

9. The method as claimed in claim 7 wherein the method comprises the step of the media authorisation component transmitting a search message to one or more backend components.

10. The method as claimed in claim 9 wherein the backend component comprises at least one of a database, a software application, or a computer program.

11. The method as claimed in claim 9 wherein the method comprises the steps of:
the media authorisation component receiving a response message from the one or more backend components, and
the media authorisation component determining whether the token is valid based on the response message.

12. The method as claimed in claim 1 wherein the user is located in proximity to the user interface component.

13. The method as claimed in claim 1 wherein the user comprises a customer.

14. The method as claimed in claim 1 wherein the user is located remotely from the user interface component.

15. The method as claimed in claim 14 wherein the method comprises the steps of:
a remote user channel component receiving the service request from the user, and
the remote user channel component transmitting the service request message to the user interface component.

16. The method as claimed in claim 15 wherein the user comprises at least one of a bank teller, an automated machine, a machine learning tool, a computer program, a financial sales agent, a customer support agent, a retail sales agent, or a hospitality sales agent.

17. A data processing system for controlling a teller machine, the system comprising a processor configured to:
receive a service request at a user interface component integrated within the teller machine from a user, the user interface component having a first set of capability parameters to control a teller machine to execute a first set of teller machine tasks, the first set of teller machine tasks excluding any ability to issue control commands to a media device driver integrated within the teller machine to dispense physical media,
transmit a service request message from the user interface component to a business application component integrated within the teller machine,
transmitting an authorisation request message from the business application component to a media authorisation component located remotely from the teller machine,
receive a validation message at the business application component from the media authorisation component, and
transmit a control message from the business application component to the media device driver to control the media device driver to dispense physical media based on the service request message and the validation message.

18. A computer program product stored on a non-transitory computer readable storage medium, the computer program product comprising instructions capable of causing a computer system to perform, when the computer program product is executed on the computer system, the following:
a user interface component integrated within a teller machine receiving a service request from a user, the user interface component having a first set of capability parameters to control a teller machine to execute a first set of teller machine tasks, the first set of teller machine tasks excluding any ability to issue control commands to a media device driver integrated within the teller machine to dispense physical media,
transmitting a service request message from the user interface component to a business application component integrated within the teller machine,
the business application component transmitting an authorisation request message to a media authorisation component located remotely from the teller machine,
the business application component receiving a validation message from the media authorisation component, and
the business application component transmitting a control message to the media device driver to control the media device driver to dispense physical media based on the service request message and the validation message.

* * * * *